Nov. 9, 1971   L. G. HORWITT ET AL   3,618,420
MECHANICAL REMOTE CONTROL APPARATUS
Filed Jan. 7, 1970   6 Sheets-Sheet 1

INVENTORS
Laurence G. Horwitt
Donald J. Mallis
BY J. Patrick Cogney
ATTORNEY

Nov. 9, 1971 L. G. HORWITT ET AL 3,618,420
MECHANICAL REMOTE CONTROL APPARATUS
Filed Jan. 7, 1970 6 Sheets-Sheet 6

INVENTORS
Lawrence G. Horwitt
Donald J. Multis
BY J. Patrick Cagney
ATTORNEY

United States Patent Office 3,618,420
Patented Nov. 9, 1971

3,618,420
MECHANICAL REMOTE CONTROL APPARATUS
Laurence G. Horwitt, New Haven, and Donald J. Mattis, Norwalk, Conn., assignors to Casco Products Corporation, Bridgeport, Conn.
Filed Jan. 7, 1970, Ser. No. 1,177
Int. Cl. F16c 1/10
U.S. Cl. 74—501 M
16 Claims

ABSTRACT OF THE DISCLOSURE

Mechanical remote control apparatus for transmitting universal movement utilizes a flexible control line containing three cables trained between a control unit swivel bearing and a controlled unit swivel bearing. The control line has a guide sheath of nylon plastic having a set of three guide passages extending in parallel lengthwise relation. For complex control line paths such as in remote outside rear view mirror systems for automobiles, the guide sheath is of oblong section to provide preferential bending in one plane and the guide passages are disposed in a common longitudinal plane determined by the major bend axis of the oblong section.

The swivel bearing units include a segmented pivot ball structure, a right angle cable guide bracket, a common adaptor and bias spring for anchoring the sheath in endwise compression and snap-fit connections for molded plastic parts.

BACKGROUND OF THE INVENTION

In mechanical remote control systems for transmitting universal movement, a flexible control line consisting of a plurality of cables is trained between a control unit and the controlled unit. In practice, the control line is required to assume a wide variety of curved, coiled or other serpentine configurations. At the bends and curves of such a control line, the cables tend to kink and rub so as to inhibit free movement thereof. More importantly, such bends and curves affect the path lengths of the individual cables in different amounts to impair the conjoint action that is normally required of such cables.

Currently, mechanical remote control systems for transmitting universal movement are widely used in connection with outside rear view mirrors for automobiles. The outside mirror may be mounted on the vehicle door or fender and the inside control may be mounted on the door, the dashboard, the windshield header, or at any other location preferably enabling the driver to adjust the mirror setting while seated in the normal driving position and observing the view presented by the mirror. To transmit universal movement, a set of three cables is employed.

In the older style vent window type of vehicle door where the mirror and the control unit were both door-mounted, the control line followed a relatively direct path of well-defined length beneath the vent window. There usually was sufficient internal door clearance for in-line cable connections. Even here, each cable follows a different path and the length and curvature differences between paths can cause friction and binding that impair the desired smoothness and uniformity of operation.

Currently, vehicle doors utilize full width glass, with no vent window and small internal door clearance. The control line cables are required to follow a complex path with abrupt bends and curves. For example, the control line cables exit at right angles from the control unit, extend forwardly along the inner door panel, follow a U-path at the leading edge of the door and lead rearwardly along the outer door panel to enter obliquely at the mirror support.

The individual cables in such a serpentine mounting environment are subject to more severe bending and kinking then heretofore. In addition, this type of mounting environment is subject to wide variations due to differences in vehicle doors, differences in mirror mounting positions and differences in mirror brackets. The problems are further aggravated by the fact that installers may tend to train the cables in different and sometimes unpredictable paths.

While custom sizing of each cable length for each installation might help to reduce the problem, manufacturing requirements make it desirable to utilize predetermined standard length control lines. Use of such standardized lengths also aggravates the coiling or looping conditions and makes cable binding more pronounced.

SUMMARY OF THE INVENTION

This invention provides a multi-cable control line arrangement for use in mechanical remote control systems to transmit movement with greater freedom, smoothness and uniformity than can be achieved by any of the prior art control line constructions.

More particularly, the invention provides remote control apparatus for swivel adjustment of a controlled member through a plurality of positions and comprising a controlled bearing unit having a swivel member carrying the controlled member for swivel movement, a control bearing unit remote from the controlled bearing unit and having a swivel member for determining swivel movement to be transmitted to the swivel member of the controlled bearing unit, and control line means having a plurality of separate flexible cables connected to act in tension between the swivel members for maintaining each swivel member seated in its bearing unit, the apparatus being characterized in that the control line means includes a cable sheath having a plurality of guide passages extending therethrough and each mounting a separate cable in lengthwise moveable relation to establish cable paths of substantially identical length and curvature for transmitting movement between the swivel members.

The embodiments illustrated herein show the controlled member as an outside rear view mirror for an automobile and the control unit as a manual actuator located within the automobile for manipulation by the driver while observing the mirror reflection of the view to the rear of the automobile. Universal swivel movement is transmitted by a flexible control line having a set of three flexible cables acting under tension between a swivel element associated with the actuator and a swivel element associated with the mirror.

In the illustrated embodiments, the control line is comprised of an elongated guide sheath of resiliently flexible lubric plastic material having a set of three guide holes extending in parallel lengthwise relation therethrough and a set of three twisted strand flexible cables, one for each hole, lengthwise shiftably mounted in the sheath to act conjointly in transmission of universal motion.

In the preferred control line embodiment, the guide sheath is oblong in transverse section to present major and minor axes that enable preferential bending of the sheath about the major axis while limiting resilient twisting of the sheath about its longitudinal axis. The oblong guide sheath has a set of three holes disposed in a common plane parallel to the major axis and, preferably, located symmetrically within the oblong section to lie in a common longitudinal plane with the major axis.

The oblong guide sheath configuration facilitates training the control line along complex paths wherein bending is constrained primarily to the plane determined by the major axis such that each cable path is of substantially identical length, experiences the same curvature and effectively curves about the same center line. Any twisting about the longitudinal axis introduces path-to-path discrepancies from an ideal uni-axis bend configuration but such twisting is limited by the inherent characteristics of the oblong section. Frictional effects at the bends are minimized by the lubric action of the guide sheath material so that uniform and smooth sliding movement of the cables is achieved in a wide variety of serpentine configurations.

The oblong guide sheath is particularly suited to the remote control outside rear view mirror applications. Such an arrangement for the vehicle door installation where full width glass is utilized is shown herein. A more severe application where the control is located in the front header is also shown to demonstrate the versatility of the unique control line arrangement in mechanical remote control systems.

The illustrated remote control mirror embodiments include additional features and improvements such as improved swivel bearing configurations, improved cable end connections, improved right angle guide housings for facilitating cable entry and unique snap-fitting assemblies for securing molded plastic parts.

Other features and advantages of the invention will be apparent from the following description and claims and are illustrated in the accompanying drawings which show structure embodying preferred features of the present invention and the principles thereof, and what is now considered to be the best mode in which to apply these principles.

BRIEF DESCRIPTION OF THE DRAWINGS

In the accompanying drawings forming a part of the specification, and in which like numerals are employed to designate like parts throughout the same.

DESCRIPTION OF PREFERRED EMBODIMENTS

Figure 1:
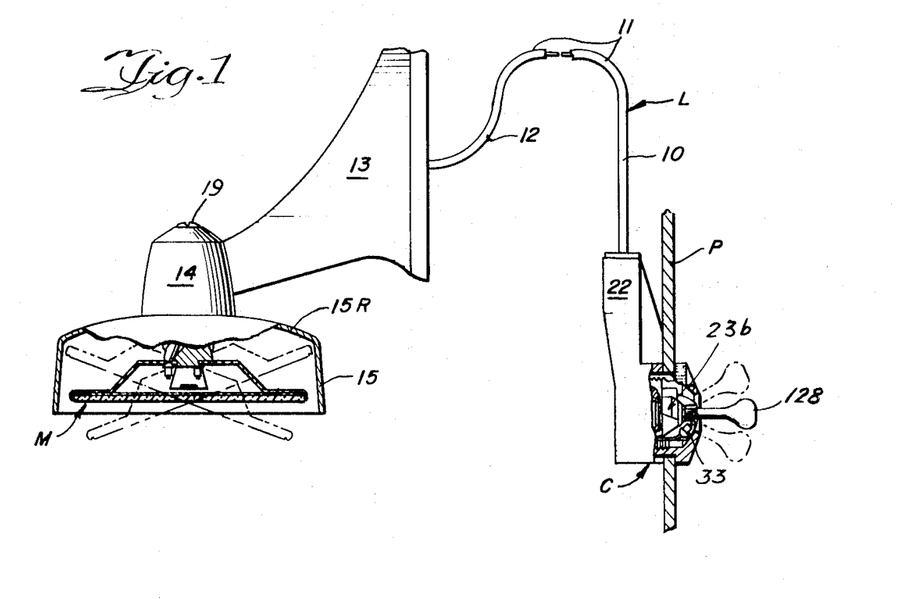
FIG. 1 is an elevational view, partly in section, showing an outside rear view mirror and control system applied to a vehicle door.

Referring now to the drawings, a preferred embodiment of a remote control arrangement is illustrated in FIG. 1 as applied to an automobile outside rear view mirror system having a mirror unit M adapted to be mounted either on the vehicle door or at any location on the exterior of the vehicle, so as to be in view of the driver and reflect the view rearwardly of the vehicle. The system includes a control unit C adapted for mounting on the interior panel P of the vehicle door for easy access from within the vehicle.

Universal movement is transmitted between the control unit C and the mirror unit M by a jacketed multicable flexible control line L trained therebetween. In practice, the control line L is required to assume a wide variety of curved, coiled, or other serpentine configurations.

A particular example of the problem of training the control line cables arises in current style vehicle doors where full width glass is utilized in lieu of vent windows. In such arrangements, the rear view mirror M is normally mounted on the external panel of the door and the control unit C is mounted on the interior panel of the door with the control line L being trained forwardly along the inner panel P, as at 10 in FIG. 1, through a U-bend as at 11 in FIG. 1, and rearwardly along the exterior panel as at 12 in FIG. 1, to clear the path of travel of the window.

Figures 2, 4, 5:
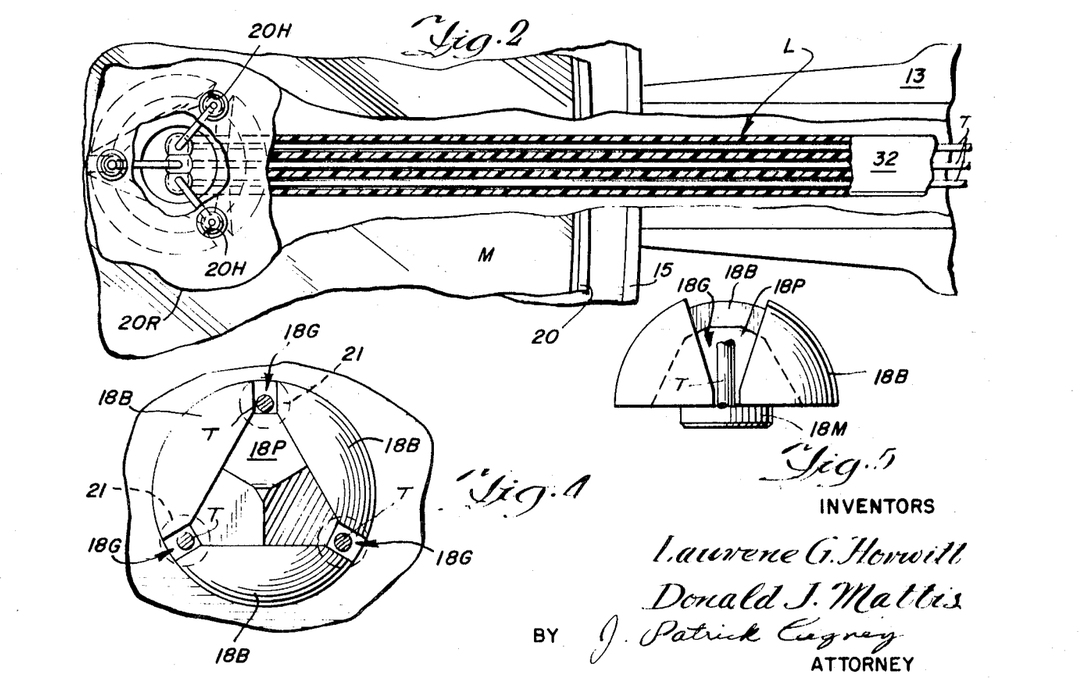
FIG. 2 is an enlarged fragmentary front elevational view, with portions broken away and in section, showing the entry of the control line to the bearing unit of the outside rear view mirror.
FIG. 4 is an end view of the pivot ball that carries the mirror and is taken approximately as indicated at 4—4 on FIG. 3.
FIG. 5 is a side elevational view of the pivot ball of FIG. 4.
Figure 3:
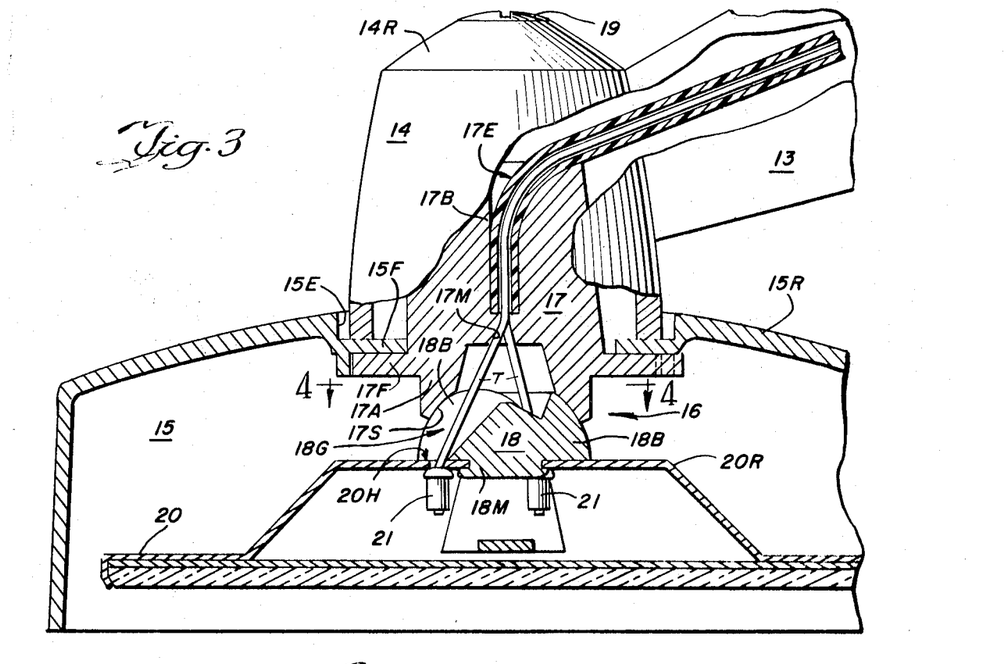
FIG. 3 is an enlarged fragmentary section through the bearing unit the outside mirror unit.

The support structure for the mirror M, as illustrated in FIGS. 1, 2 and 3 includes an attachment arm 13 in the form of a hollow neck for direct connection to the vehicle, a hollow bell 14 carried at the extremity of the neck and a hollow open-ended shroud 15 attached to the bell 14 and serving as a mounting head for receiving the mirror in recessed relation, with sufficient peripheral and back clearance to accommodate universal swivelling movement.

As best seen in FIG. 3, the shroud 15 has an apertured rear wall 15R provided with an offset annular flange 15F bordering a central opening. An external shoulder portion 15E encircles the flange 15F to define an external recess for receiving the open end of the bell 14. An internal rim portion 15I borders the flange 15F to define an internal mounting pocket for a controlled bearing unit 16 shown as a universal swivel bearing that carries the mirror M.

The controlled end swivel bearing 16 is comprised of a stationary socket member 17 and a pivot ball 18 serving as the swivel member. The socket 17 is in the form of an insert having a key flange 17F seated in the internal recess of the shroud 15 for preventing rotation of the socket relative to the shroud. The bell 14, shroud 15 and insert socket 17 are fixed in assembled relation by a screw 19 which seats in the rear wall 14R of the bell and threads into a tapped hole (not shown) provided at the rear of the socket 17.

The rearwardly projecting main body portion of the insert socket 17 terminates intermediately within the hollow bell 14. The forwardly projecting portion of the insert socket 17 is in the form of an annular wall 17A. The insert socket 17 has a central through passage comprised of an oblique rear entryway 17E merging with an oval bore 17B leading to a restricted mouth 17M that flares into an enlarged space encircled by the annular seat wall 17A. The spherical seat surface 17S on the annular wall 17A has a radius of curvature of 0.375 inch in the illustrated embodiment.

The mirror M is carried in a retainer frame 20 having a dished rear wall 20R provided with a central opening surrounded by a set of three symmetrically spaced cable mounting holes 20H. The pivot ball 18 has a peened central mounting stub 18M projecting through the retainer wall opening to lock the ball 18, the mirror M and the frame 20, for movement as a unit.

As best seen in FIGS. 4 and 5, the pivot ball 18 has an island contour characterized by three symmetrically spaced complemenetary ball segments 18B having a common center of curvature and integrally projecting from a common central pedestal 18P to define circumferential gaps 18G between adjacent ends of the ball segments and disposed within the spherical outline determined by the ball segments. The circumferential gaps 18G merge with relieved regions adjacent the pedestal and are arranged for registry with the cable mounting holes 20H in the retainer frame 20 to accommodate the flexible control cables T which lead from the mouth 17M of the insert and conjointly act in tension to transmit universal motion from the control unit.

As is typical, each cable T is terminated in a ferrule 21 which is shown in the well of the retainer frame 20. The parti-spherical surfaces presented by each of the ball segments 18B have a radius of curvature of .375 inch to match that of the concave spherical seat 17S and define a common center or pivot point for the controlled bearing unit. As is explained hereinafter, the cables T are under tension in the final assembly of the unit and continuously act to hold the ball segments 18B in smoothly seated swivel engagement with the spherical seat surface 17S on the insert for all positions of movement.

The control unit C is mounted upon the interior door panel P and, as best seen in FIGS. 7 to 10, is shown to include an L-shaped cable guide bracket 22 disposed within the door space, a support seat 23 having a socket portion 24 for snap-fit connection to a plug portion 25 of the guide bracket, the seat 23 having a stationary ball portion 23B projecting through the panel opening, a socket or actuator 26 riding on the ball 23B to serve as the swivel member, and a bezel 27 mounted on the exposed face of the door panel P and having a circular wall 27W projecting into screw-threaded engagement with the threaded outer periphery 23T of the actuator seat 23. These parts are clamped to the door panel by turning the bezel 27 onto the actuator seat 23 to draw the actuator seat forwardly until the guide bracket 22 clamps against the panel P.

The snap-fit connection between the bracket plug 25 and the socket portion 24 of the actuator is of high strength to enable a firm clamping action to be maintained between the bezel 24, the guide bracket 22 and the vehicle door panel P.

The bracket plug portion 25 is shown to have a lengthwise tapering body provided with a radially outwardly tapering annular ring portion 25R of trapezoidal profile (See FIG. 10A) presenting a lengthwise tapered cylindrical surface 25C bordered at opposite ends by oblique annular shoulders 25S, 25T of opposite bevel. The socket portion 24 for receiving the plug has an annular wall 24A defining a central socket of corresponding lengthwise taper. The annular wall 24A terminates in a circular array of three symmetrically spaced cantilever leg portions 24L that are of complementary arcuate shape. (See FIG. 8). The annular wall 24A has a radially outwardly projecting internal annular recess 24R of trapezoidal profile presenting a lengthwise tapered cylindrical surface 24C bordered at opposite extremities by oblique shoulder surfaces 24S, 24T of opposite bevel.

To define the cantilever legs 24L, the annular wall 24A is provided with a circular groove 24G and a set of three radial notches 24N. The circular groove 24G opens endwise toward the plug 25 and encircles the central socket S to a depth beyond the adjacent shoulder surfaces 24S and the radial notches 24N open endwise toward the plug 25 and lead from the central socket S to the circular groove 24G. The groove and notch configuration enables the degree of leg flexing necessary to accommodate force-fit insertion of the plug 25 into the central socket to effect seating of the annular ring 25R within the annular recess 24R in a relationship wherein only the beveled shoulders 24S and 25S engage the beveled shoulders 24T and 25T. The tapered plug and socket structure provides automatic lead-in and cooperates with the beveled shoulders in achieving high strength against pull out. The snap-fit parts are otherwise free of axial engagement so that these shoulders transmit the axial loads between the parts. This relationship achieves an unusually high strength connection which resists pullout under all normal conditions. The strength of the joint against pull-out also tends to increase with use.

The embodiment illustrated herein for plastic parts can be molded of stiff materials such as acetals as marketed under the trademarks Delrin and Celcon. The snap-fit arrangement facilitates molding and removal from the mold and enables complex part configurations and surface treatments to be applied to the individual parts prior to final assembly. A unitary structure with surface coatings and other features could not be provided in many instances. In the illustrated embodiments, typical dimensions for a preferred snap-fit connection are:

A taper of 8° for the plug 25, the surface 25C, the central socket S and the surface 24C; the beveled shoulders 24S, 24T, and 25S, 25T are at 45° to the center axis; the radial offset of each of the cylindrical surfaces 24C, 25C is about .010 inch; the diameter of the plug 25 is .431 inch at the root of the beveled shoulder 25T; the diameter of the central socket S is .441 inch at the root of the beveled shoulder 24T; the beveled shoulders 24S and 25S are approximately 0.050 and 0.110 inch respectively, from the end of the socket and the groove 24G is .078 inch deep, .031 inch wide and has a mean diameter of .551 inch; and the legs 24L have an inside diameter of 0.465 inch.

The stationary ball portion 23 has an annularly arrayed spherical seat surface 23S. The actuator 26 has a mating annular spherical seat surface 26S for engagement on the ball surface 23S, both surfaces being curved about a common center. A set of three post portions 23P spaced circumferentially about the spherical seat surface 23S cooperates in receiving and guiding the actuator 26. A control handle 28 anchored in the actuator 26 projects centrally through the bezel 27 for enabling the operator to effect universal swivel adjustment at the control end.

Figures 6, 7, 11, 12:
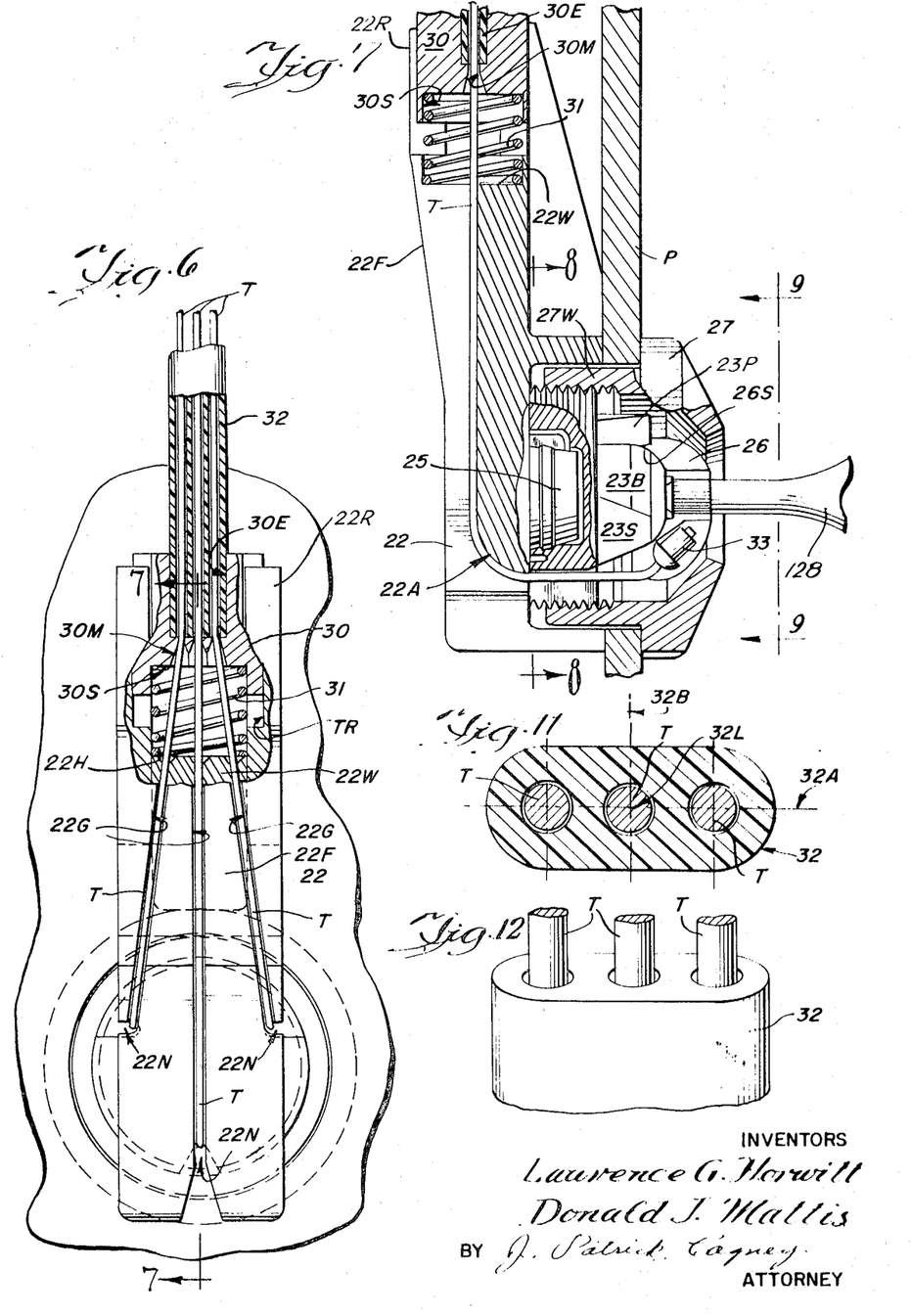
FIG. 6 is a fragmentary rear view at the control unit with portions broken away and in section, showing the control line entry.
FIG. 7 is a section through the control unit taken as indicated at 7—7 on FIG. 6.
FIG. 11 is an enlarged transverse section through the control line.
FIG. 12 is a fragmentary perspective view showing one end of the control line.
Figures 8, 9, 10, 10A:
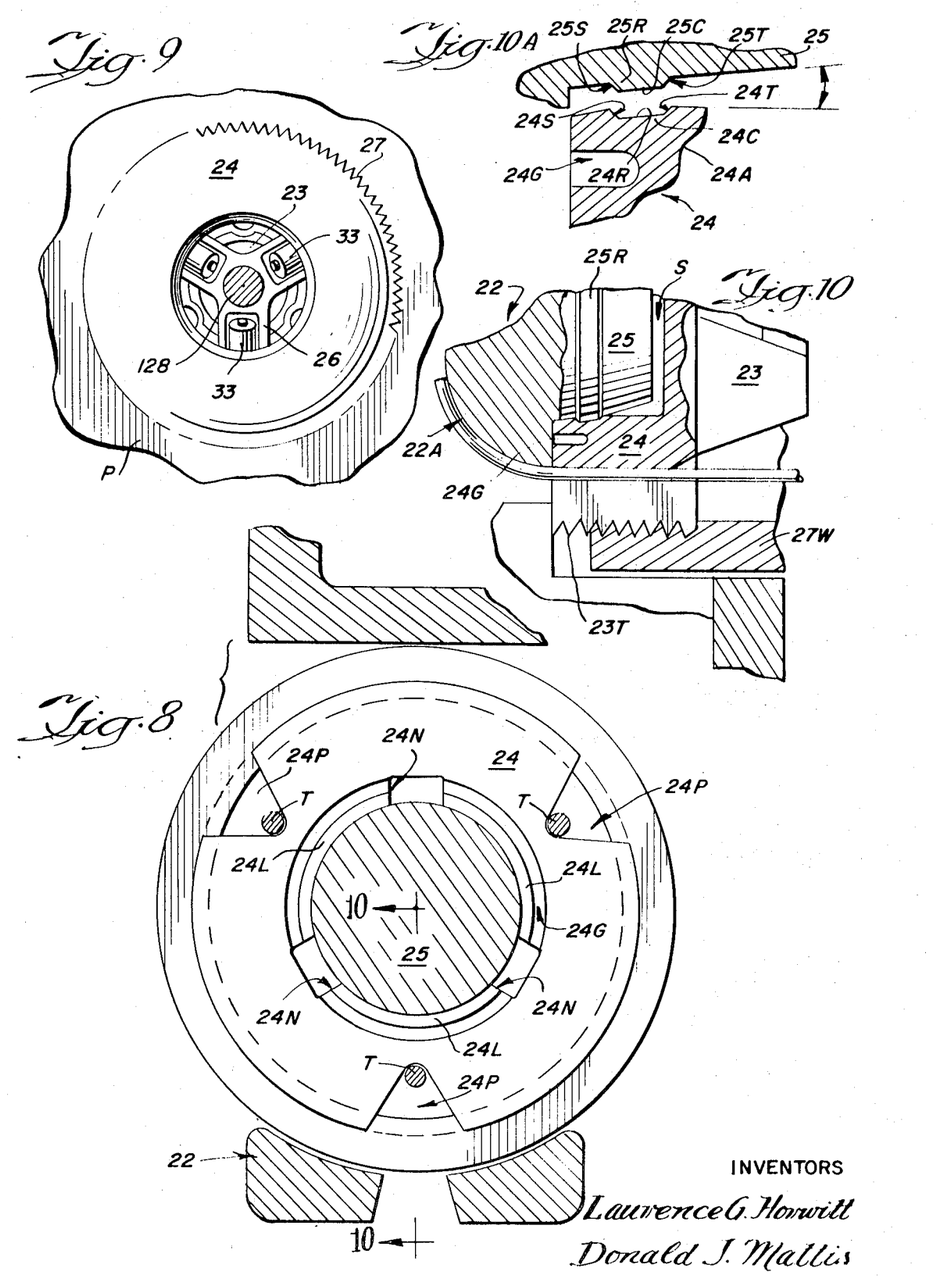
FIG. 8 is a greatly enlarged section through the control unit taken as indicated at 8—8 on FIG. 7.
FIG. 9 is a front view of the actuator seat of the control unit and is taken on the line 9—9 on FIG. 7.
FIG. 10 is a greatly enlarged fragmentary section corresponding to the lower portion of FIG. 7 and taken approximately as indicated by the line 10—10 on FIG. 8.
FIG. 10A is an enlarged fragmentary detail view of a snap-fit connection structure.

The guide bracket 22 has an elongated guide face 22F provided with divergent grooves 22G for determining the line of each cable T. Each groove 22G leads to an arcuate guide wall surface 22A and an associated edge notch 22N. As best shown in FIGS. 6 and 7, the cables T lead endwise into the bracket 22 and along the grooved guide face 22F, and then through edge notches 22N that are spaced about the plug portion 22P. The cables T lead through circumferentially spaced edge notches 24N in the annular wall 24A of the actuator seat 23 and are secured in ferrules 33 seated in circumferentially spaced sockets provided in the body of the actuator 26.

The guide bracket 22 has a recessed cross wall 22W provided with a mouth region aligned in registry with the guide face grooves 22G and comprised of a set of three entry-holes 22H arranged in a common plane and each having its access groove 22G opening through a common edge of the wall to facilitate laying the cables into the guide bracket. Flanged side rail portions 22R extend endwise beyond the cross wall 22W to define a trackway T for guiding a floating adaptor 30 that is carried in endwise shiftable relation by the guide bracket. The adaptor 30 has a central passage comprised of an entry region 30E of oblong section, a restricted mouth region 30M comprised of individual slots and an enlarged circular exit region 30S. A bias spring 31 shown in the form of a wire coil reacts between the adaptor 30 and the cross wall 22W of the guide bracket, normally to urge the adaptor 30 endwise outwardly.

In accordance with this invention, the three control cables T are housed in an elongated guide sheath 32 of resiliently flexible lubric plastic material having a set of three lengthwise guide holes 32P extending in parallel relation therethrough. The control cables T are of twisted strand stainless steel wire for maximum strength and flexibility and are lengthwise shiftably mounted to act conjointly in transmission of universal motion.

The guide sheath 32 in the preferred embodiment is illustrated in FIGS. 11 and 12 and is oblong in transverse section to present a major transverse axis 32A and a minor transverse axis 32B. The oblong section contour enables preferential bending of the sheath about the major axis 32A while limiting resilient twisting of the sheath about its longitudinal axis 32L which is coaxial with the center guide passage 32P.

In the disclosed embodiment for outside remote control mirrors, the guide sheath is a one-piece extrusion of nylon 6—6, with a major axis dimension of 0.260 inch, a minor axis dimension of 0.107 inch and guide passages of 0.047 inch diameter spaced 0.077 inch center to center and located in a common plane coincident with the lengthwise plane defined by the major axis of the sheath. The nylon 6—6 formulation is utilized for its temperature characteristics, for example, its strength, resilience, flexibility and lubricity properties being retained from −40° F. to +250° F. At the control end, the oblong sheath 32 is seated in force-fit relation within the oblong entry region 30E of the adaptor 30 which typically may be 0.260 x .072 inch for the specific sheath sizes given herein. At the controlled end, the sheath is seated within the oblong bore 17B which typically may be of .280 x .115 inch.

At the control end, the ends of the cables T are trained through the grooves and notches of the right angle guide bracket 22 and pass through peripheral actuator seat notches 24P in free clearance to anchor in ferrules 33 in the actuator sockets. At the controlled end, the ends of cables T extend through the restricted mouth 17M and flare outwardly to lead through the circumferential gaps 18G of the pivot ball 18 in free clearance relation and through the mounting holes 20H to anchor in the ferrules 21 within the retainer frame 20.

The bias spring 31, in normally urging the adapter 30 outwardly of the guide bracket 22, develops endwise compression loading on the sheath 32 to urge the controlled end of the sheath endwise into the oblong bore 17B in the insert socket 17, thus tending to bow the sheath and subject each of the cables T to a uniform tension, as determined by the spring load. The bowing of the sheath causes friction contact of each cable T with the sheath walls. The cables T act conjointly at the controlled end to draw and hold the pivot ball 18 firmly seated against the insert socket 17 and act conjointly at the control end to draw and hold the actuator 26 firmly seated upon the pivot ball 23B.

The configuration assumed by the sheath, due to the path determined by the mounting environment and/or due to the bowing action imparted by the bias spring 31 is predominantly in the plane of bending determined by the major axis A so that each cable path remains the same in length and curvature and each cable exhibits the same freedom for longitudinal movement. By way of illustrative disclosure, a sheath two feet in length can be twisted about its lengthwise axis only about ½ turn and even this amount of twist is continuously and resiliently resisted. Such a distortion in path length can be accommodated because the lubric action of the sheath material minimizes frictional resistance to lengthwise cable movement.

In the typical operation of the remote control arrangement, a swivel movement imparted to the actuator is transmitted to the mirror M through the combined effect of the three cables T. The movement ratio may be in one to one correspondence or any other value that may be desired. The lengthwise movements of the twisted cables T within the sheath 32 develops a saw action normally tending to wear or cut the sheath but the lubric action of the sheath material reduces this effect to negligible proportions.

In the particular guide bracket construction, which also preferably is of a high strength molded acetal plastic resin, the cables T are constrained by the tension loads on each to remain within the grooves 22G and follow the individual right angle bend paths determined by the arcuate guide walls 22A and edge notches 22N. Since the sheath terminates in line in the angled end of the guide bracket, no sharp right angle bend is required at the control end of the sheath. The actuator movements are accommodated without invading the limited space available within the vehicle door.

The movement ratio is maximized relative to the size of swivel bearing 16 at the controlled end by the segmented ball configuration 18B used in conjunction with the central entry passage for the socket 17. The clearance gaps 18G enable the cable tie points to be at large radius locations without reducing the effective radius of the swivel bearing 16.

Figures 13, 14, 15:
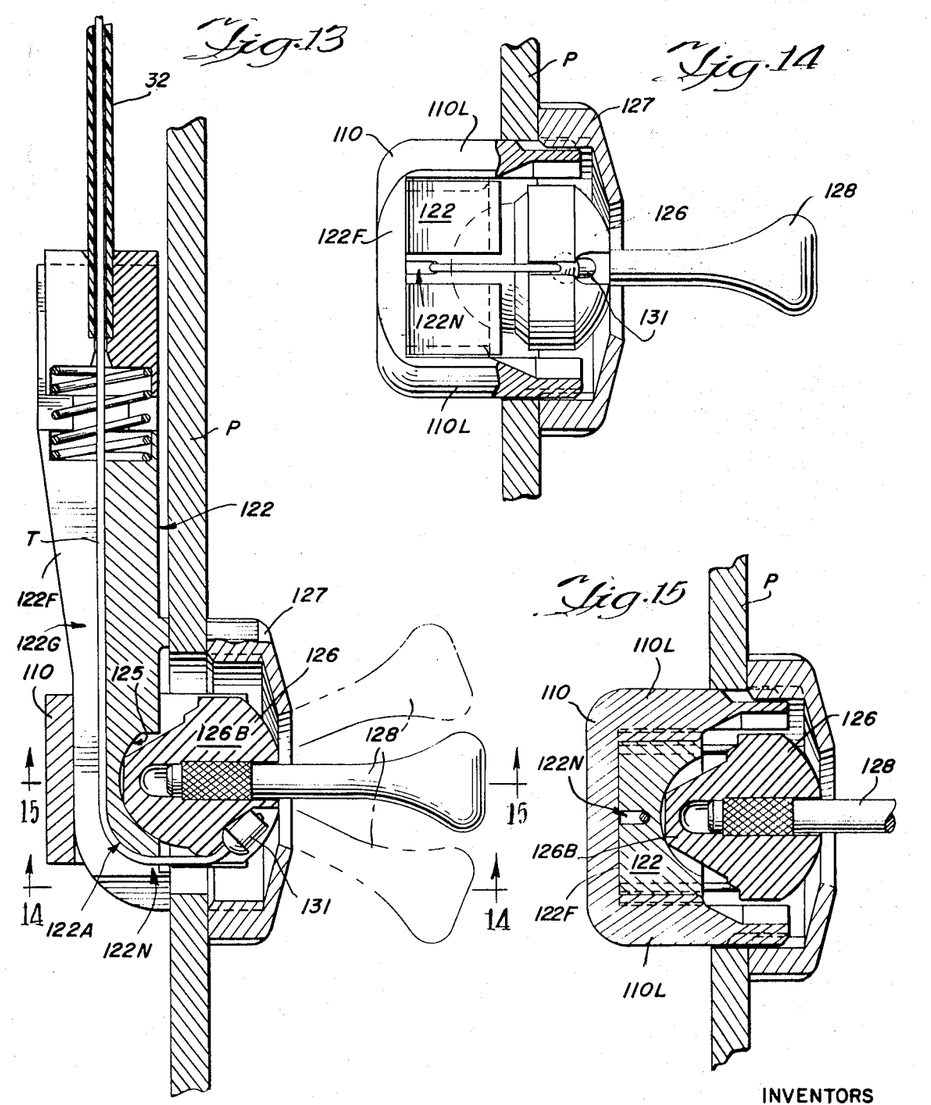
FIG. 13 is a section corresponding to FIG. 7 and showing another control unit embodiment.
FIG. 14 is a section taken on the line 14—14 of FIG. 13.
FIG. 15 is a front view of the control unit of FIG. 13.

A modified right angle control unit arrangement shown in FIGS. 13, 14 and 15 has a shallower construction that occupies less door space. Reference characters in the 100 series are utilized to show the corresponding structural features. The control unit includes a guide bracket 122 having a guide face 122F with flaring cable grooves 122G leading to arcuate walls 122A that terminate at edge notches 122N spaced symmetrically about an integral concave spherical socket 125 that is located in registry with the panel opening. An actuator 126 has a ball portion 126B seated in the socket 125 for universal swivel movement and a separate handle 128 anchored therein, the actuator having symmetrically spaced pockets to receive ferrules 131 that anchor the ends of the cables T.

The control unit is clamped in position between a bezel 127 and a U-shaped yoke 110 having arcuate legs 110L straddling the angled end of the guide bracket and terminating in externally threaded free ends that project through the panel opening for securement to the bezel 127. In this form, both the guide bracket and the actuator are molded of high strength acetal plastic resin.

Figure 16:
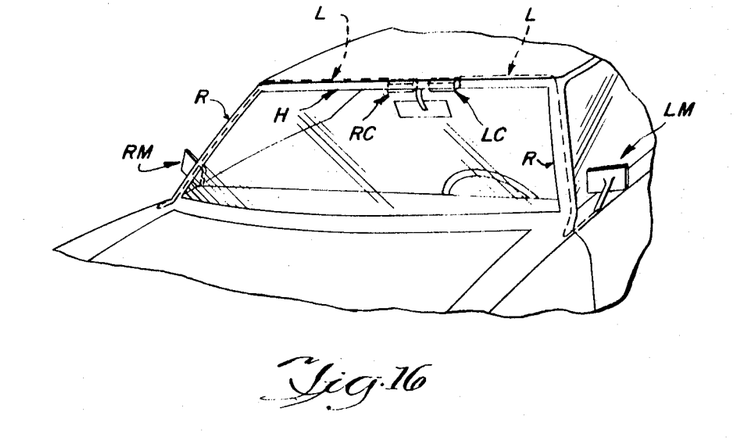
FIG. 16 is a diagrammatic view of a dual remote control mirror system for a windshield header installation.

A complex remote control application for which the present invention is uniquely suited is shown in FIG. 16 where a left-hand outside rearview mirror LM and a right-hand outside rearview mirror RM are shown on opposite sides of a vehicle and are remotely operated by dual control units LC, RC shown positioned centrally along the top windshield header H. With this arrangement, the driver may conveniently adjust both mirrors.

The control lines L are shown leading oppositely along the top header H, then down the risers R to the door posts and into the front edges of the doors to connect to the mirrors LM, RM. The oblong sheath contour as shown in FIGS. 11 and 12 enables the control line to follow the sharp turns and bends while automatically tending to resist distortion from a single bend plane as previously described.

The uniformity of the individual cable paths in this configuration and the required free cable movement is assured by the sheath configuration of FIGS. 11 and 12. The control unit embodiment of FIGS. 13, 14 and 15 being shallower is particularly suited for the illustrated header mounting location.

Figures 17, 18, 19:
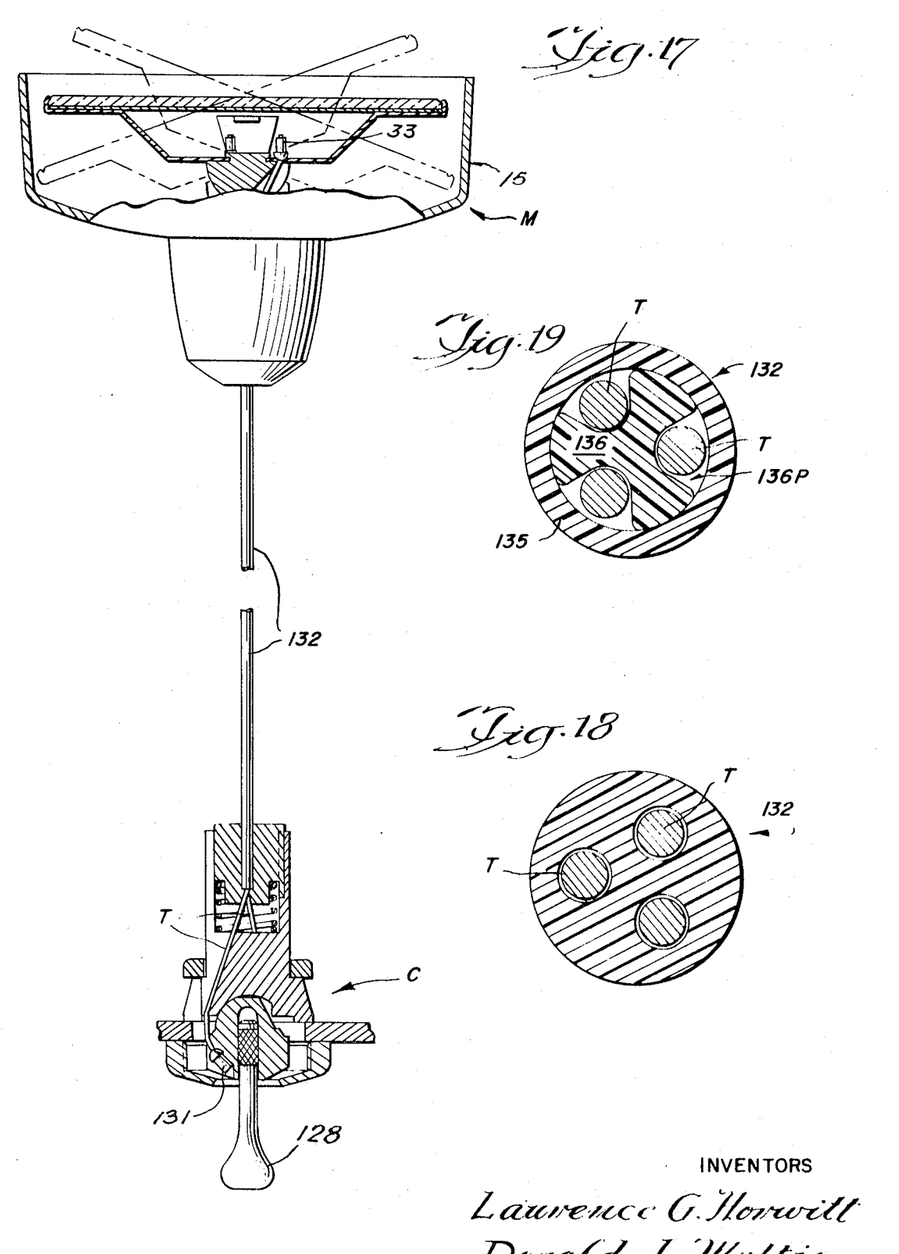
FIG. 17 is a fragmentary diagrammatic view of an in line control unit and control line arrangement.
FIGS. 18 and 19 are sectional views showing different forms of cable sheaths.

A further embodiment of the invention is illustrated in FIG. 17 wherein an in-line control unit C and controlled unit M are shown connected through a direct and substantially straight control line. In this arrangement, the sheath 132 has a set of three parallel guide passages for individually mounting three flexible stranded cables T which are normally maintained in tension as previously described. The sheath may be of oblong section with holes in a common central plane as shown in FIGS. 11 and 12, or may be of circular form as shown for the sheaths of FIGS. 18 and 19, wherein the guide passages are spaced symmetrically about the central axis of the sheath. In FIG. 18, the sheath for the control line is shown as a single extrusion of a lubric plastic material such as nylon 6—6 having individual circular guide passages. In FIG. 19, a unitized sheath is shown as comprised of a cylindrical sleeve 135 snugly encasing a symmetrical 3-legged fan-shaped web or core 136 to define individual sector shaped guide passages 136P. The sleeve is secured to the extremities of the web legs along the entire length or at suitably lengthwise spaced locations to assure unity of action.

Thus, while preferred constructional features of the invention are embodied in the structure illustrated herein, it is to be understood that changes and variations may be made by those skilled in the art without departing from the spirit and scope of the appended claims.

What is claimed is:

1. Remote control apparatus for swivel adjustment of a controlled member through a plurality of positions and comprising a controlled bearing unit having a swivel member carrying the controlled member for swivel movement, a control bearing unit remote from the controlled bearing unit and having a swivel member for determining swivel movement to be transmitted to the swivel member of the controlled bearing unit, and control line means having a plurality of separate flexible cables connected to act in tension between said swivel members for maintaining each swivel member seated in its bearing unit, said apparatus being characterized in that said control line means includes a resiliently flexible cable sheath having a plurality of separate guide passages extending in coplanar relation therethrough for any training configuration assumed by said sheath, each of said passages uniformly guiding a separate cable in lengthwise movable relation to establish cable paths of substantially identical length and curvature for freely and smoothly transmitting movement between said swivel members for any training configuration assumed by said sheath.

2. Remote control apparatus as defined in claim 1 and characterized in that said control line means includes spring means reacting between the cable sheath and one of said bearing units to load the length of the cable sheath in endwise compression for developing tension in the cables.

3. Remote control apparatus as defined in claim 1 and wherein each bearing unit supports its swivel member for universal swivel movement and further characterized in that the cable sheath is of resiliently flexible lubric plastic material having a set of three guide passages extending in parallel lengthwise relation therethrough and a set of three twisted strand flexible cables, one for each guide passage, are lengthwise shiftably mounted in the sheath to act conjointly in transmission of universal swivel motion.

4. Remote control apparatus as defined in claim 3 and wherein said cable sheath is a one-piece extrusion having said guide passages disposed in symmetrically spaced relation therein.

5. Remote control apparatus as defined in claim 1 and characterized in that the cable sheath has an oblong transverse sectional profile along its length to present major and minor transverse axes enabling preferential bending of the sheath about the major transverse axis while limiting twisting of the sheath about its longitudinal axis.

6. Remote control apparatus as defined in claim 1 and characterized in that the cable sheath is of resiliently flexible lubric plastic material having an oblong transverse sectional profile along its length to present major and minor transverse axes enabling preferential bending of the sheath about the major transverse axis while limiting twisting of the sheath about its longitudinal axis, said sheath having said guide passages disposed in a common plane parallel to the major transverse axis.

7. Remote control apparatus as defined in claim 6 and characterized in that said guide passages are located symmetrically within the oblong sectional profile to define a common longitudinal plane coincident with the major transverse axis.

8. Remote control apparatus as defined in claim 1 and wherein each bearing unit supports its swivel member for universal swivel movement, and further characterized in that the cable sheath is of resiliently flexible lubric plastic material having an oblong transverse sectional profile along its length to present major and minor transverse axes enabling preferential bending of the sheath about the major transverse axis while limiting twisting of the sheath about its longitudinal axis, said sheath having a set of three guide passages disposed in a common plane parallel to the major transverse axis, and a set of three twisted strand flexible cables, one for each guide passage, lengthwise shiftably mounted in the sheath to act conjointly in transmission of universal swivel motion.

9. Remote control apparatus as defined in claim 8 and characterized in that said guide passages are located symmetrically within the oblong sectional profile to define a common longitudinal plane coincident with the major transverse axis.

10. Remote control apparatus as defined in claim 1 and wherein one of said bearing units includes a ball-type swivel member seated in a socket-type support member, the swivel member having a pivot ball structure characterized by a set of symmetrically spaced complementary ball segments having a common center of curvature and defining circumferential gaps located within the spherical outline determined by the ball segments and the support member having a central passage opening through an annularly arranged spherical seat surface, each of said cables extending in free clearance relation through a separate circumferential gap to anchor relative to said swivel member at an effective radius that is substantially less than the radius of curvature of the spherical outline.

11. Remote control apparatus as defined in claim 10 and wherein the pivot ball structure is of one piece having an island contour characterized by a central pedestal integrally supporting a set of three ball segments.

12. Remote control apparatus as defined in claim 1 wherein the controlled bearing unit includes a ball-type swivel member seated in a socket-type support member, the support member having a central passage including a restricted mouth region opening through an enlarged space bounded by an annularly arranged spherical seat surface, the swivel member having a one-piece pivot ball structure of an island contour characterized by a central pedestal integrally supporting a set of three symmetrically spaced complementary ball segments that have a common center of curvature and define circumferential gaps located within a spherical outline determined by the ball segments, said cable sheath located in said central passage in endwise abutment with the support member and having three guide passages therein, each of said cables projecting from a separate guide passage through the mouth region and extending in free clearance relation through a separate one of said gaps to anchor relative to said swivel member at an effective radius that is substantially less than the radius of curvature of the spherical outline.

13. Remote control apparatus as defined in claim 1 and wherein one of said bearing units includes a right angle cable guide bracket having a transverse wall provided with a central passage for entry of said cables, an elongated guide wall presenting coplanar guide surfaces aligned with said central passage and having a separate edge notch for each cable to determine a distinct right angle path of movement for each cable.

14. Remote control apparatus as defined in claim 13 and wherein said guide bracket has side rail portions projecting endwise beyond said transverse wall to define a trackway, an adaptor slidable endwise in said trackway and having a central passage including a restricted mouth region opening toward and in registry with the central passage of the transverse wall, said cable sheath disposed in the adaptor passage in endwise abutment therewith and spring means reacting between the guide bracket and the adaptor to load the length of the cable sheath in endwise compression.

15. Remote control apparatus as defined in claim 13 and wherein the guide face has a separate groove for each cable and leading from said central passage to an arcuate wall surface that leads to the corresponding edge notch.

16. Remote control apparatus as defined in claim 1 and wherein one of said bearing units includes a cable guide bracket having a transverse wall provided with a central passage for entry of said cables, an elongated guide wall presenting coplanar guide surfaces aligned with said central passage and having a separate edge notch for each cable to determine a distinct right angle path of movement for each cable, said guide bracket having side rail portions projecting endwise beyond the transverse wall to define a trackway, an adaptor slidable endwise in said trackway and having a central passage including a restricted mouth region opening toward and in registry with the central passage of the transverse wall, said cable sheath disposed in the adaptor passage in endwise abutment therewith and spring means reacting between the guide bracket and the adaptor to load the length of the cable sheath in endwise compression.

References Cited

UNITED STATES PATENTS

| | | | |
|---|---|---|---|
| 1,630,217 | 5/1927 | Rasor | 74—501 M |
| 2,931,245 | 4/1960 | Jacobson | 74—501 M |
| 3,195,369 | 7/1965 | Warhol | 74—501 M |
| 3,373,632 | 3/1968 | Jeromson | 74—501 P |
| 3,438,280 | 4/1969 | McCabe | 74—501 |
| 3,444,754 | 5/1969 | Liedel | 74—501 M |

FOREIGN PATENTS

| | | |
|---|---|---|
| 855,307 | 1/1939 | France. |
| 740,971 | 11/1955 | Great Britain. |

MILTON KAUFMAN, Primary Examiner